United States Patent
Lin

(10) Patent No.: US 9,981,365 B2
(45) Date of Patent: May 29, 2018

(54) QUICK-RELEASE DEVICE FOR SCREWDRIVER BITS

(71) Applicant: Tsung-Te Lin, Taichung (TW)

(72) Inventor: Tsung-Te Lin, Taichung (TW)

(73) Assignee: YOU LU ENTERPRISE CO., LTD., Taichung (TW)

( * ) Notice: Subject to any disclaimer, the term of this patent is extended or adjusted under 35 U.S.C. 154(b) by 38 days.

(21) Appl. No.: 15/170,595

(22) Filed: Jun. 1, 2016

(65) Prior Publication Data
US 2017/0348831 A1    Dec. 7, 2017

(51) Int. Cl.
*B23B 31/107* (2006.01)
*B25B 23/00* (2006.01)

(52) U.S. Cl.
CPC ........ *B25B 23/0035* (2013.01); *B23B 31/107* (2013.01); *B23B 2231/04* (2013.01); *Y10S 279/904* (2013.01); *Y10T 279/17794* (2015.01); *Y10T 279/3406* (2015.01)

(58) Field of Classification Search
CPC .............. B23B 31/107; B23B 2231/04; B23B 2260/136; B25B 23/005; B25B 23/0035; Y10T 279/3406; Y10T 279/3412; Y10T 279/17786; Y10T 279/17153; Y10T 279/17794; Y10S 279/904; Y10S 279/906
See application file for complete search history.

(56) References Cited

U.S. PATENT DOCUMENTS

| | | | | |
|---|---|---|---|---|
| 2,829,685 A * | 4/1958 | Mitchell | ............... | B25B 23/005 81/451 |
| 4,630,958 A * | 12/1986 | McCallister | ............ | F16B 21/18 403/155 |
| 5,884,541 A * | 3/1999 | Habermehl | ............. | B25B 13/06 279/155 |
| 6,179,303 B1 * | 1/2001 | Jansen | ................... | B23B 29/046 279/103 |
| 6,474,656 B1 * | 11/2002 | Thomas | .............. | B23B 31/1071 279/30 |
| 6,953,196 B1 * | 10/2005 | Huang | ................ | B23B 31/1071 279/155 |
| 8,262,098 B2 * | 9/2012 | Maras | ................... | B23B 31/008 279/133 |
| 8,578,823 B2 * | 11/2013 | Hale | ................... | B25B 23/0035 279/79 |

(Continued)

*Primary Examiner* — Eric A Gates
*Assistant Examiner* — Chwen-Wei Su
(74) *Attorney, Agent, or Firm* — Egbert Law Offices, PLLC

(57) ABSTRACT

A quick-release device for screwdriver bit includes a shank having a polygonal hole longitudinally defined in one end thereof and adapted for partially receiving a bit. At least one slot is longitudinally defined in the shank. An annular groove is defined in an inner periphery of the polygonal hole and communicates with the at least one slot, wherein the annular groove is formed with a tapered section toward the first end of the shank. An expandable limit element is received in the annular groove. A sleeve is movably sleeved on the shank. The sleeve has at least one protrusion inwardly extending therefrom and engaged into the at least one slot and abutting against the limit element when removing the bit form the polygonal hole. A stopper is secured on one end of the shank for preventing the sleeve from removing from the shank.

5 Claims, 7 Drawing Sheets

(56) References Cited

U.S. PATENT DOCUMENTS

| | | | | |
|---|---|---|---|---|
| 8,864,143 B2* | 10/2014 | Lin | ................... | B25B 23/0035 |
| | | | | 279/128 |
| 8,864,144 B2* | 10/2014 | Hsu | ................... | B25B 23/0035 |
| | | | | 279/128 |
| 2008/0100005 A1* | 5/2008 | Chen | ................... | B25B 15/001 |
| | | | | 279/75 |

* cited by examiner

QUICK-RELEASE DEVICE FOR SCREWDRIVER BITS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a quick-release device, and more particularly to a quick-release device for screwdriver bits.

2. Description of Related Art Including Information Disclosed Under 37 CFR 1.97 and 37 CFR 1.98

In our daily life, a screwdriver bit is usually longitudinally mounted into a hand tool for rotating a screw or a bolt. However, the standards of the screw/bolt are various. Consequently, the bits need to be often changed and a quick-release device for the screwdriver bit is needed for smooth operations.

The conventional hand tool has a ring movably sleeved on a distal end thereof for mounting the bit and multiple steel balls are respectively radially disposed in the ring for selectively positioning the bits. An outer sleeve is movably sleeved on the ring for selectively inwardly pushing the steel balls to hold the inserted bit in place. However, the inner space of the ring is limited such that to process space for/and mount steel balls is a difficult work and the processing cost of the ring is raised. Furthermore, the ring needs to have a thick wall for ensuring the structural strength of the ring after being processed. As a result, the ring must be made thicker and the metal material is wasted and a small operating space is very inconvenient for operation.

The present invention has arisen to mitigate and/or obviate the disadvantages of the conventional hand tool.

BRIEF SUMMARY OF THE INVENTION

The main objective of the present invention is to provide an improved quick release device that is provides to selectively hold a screwdriver bit in place.

To achieve the objective, the quick-release device in accordance with the present invention comprises a shank having a first end and a second end. The shank has a polygonal hole longitudinally defined in the first end thereof and the polygonal hole is adapted for partially receiving a bit, wherein the bit has a groove annularly defined therein. At least one slot is longitudinally defined in the first end of the shank. An annular groove is defined in an inner periphery of the polygonal hole and communicates with the at least one slot, wherein the annular groove is formed with a tapered section toward the first end of the shank. An expandable limit element is received in the annular groove, wherein the limit element has an outer diameter slightly smaller than a diameter of the annular groove. A sleeve is movably sleeved on the first end of the shank. The sleeve has at least one protrusion inwardly extending therefrom, wherein the at least one protrusion is engaged into the at least one slot to prevent the sleeve from being rotated relative to the hollow stub and the at least one protrusion abuts against the limit element when removing the bit form the polygonal hole. A stopper is secured on one end of the shank for preventing the sleeve from removing from the shank.

Further benefits and advantages of the present invention will become apparent after a careful reading of the detailed description with appropriate reference to the accompanying drawings.

BRIEF DESCRIPTION OF THE SEVERAL VIEWS OF THE DRAWINGS

FIG. 3A is a perspective view of a second embodiment of the locking member in accordance with the present invention.

DETAILED DESCRIPTION OF THE INVENTION

Figure 1:
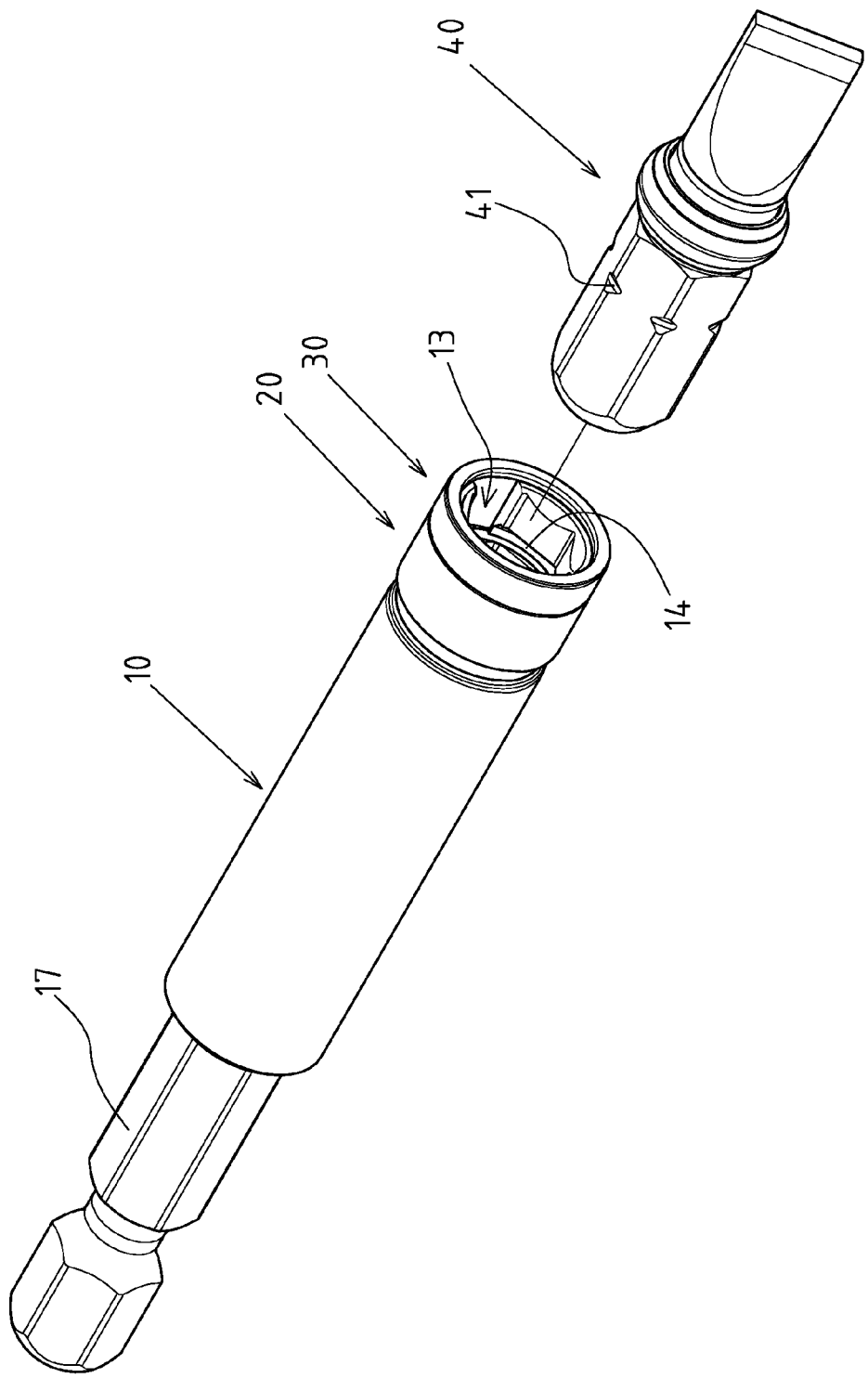
FIG. 1 is a perspective view of a quick-release device for screwdriver bits in accordance with the present invention.
Figure 2:
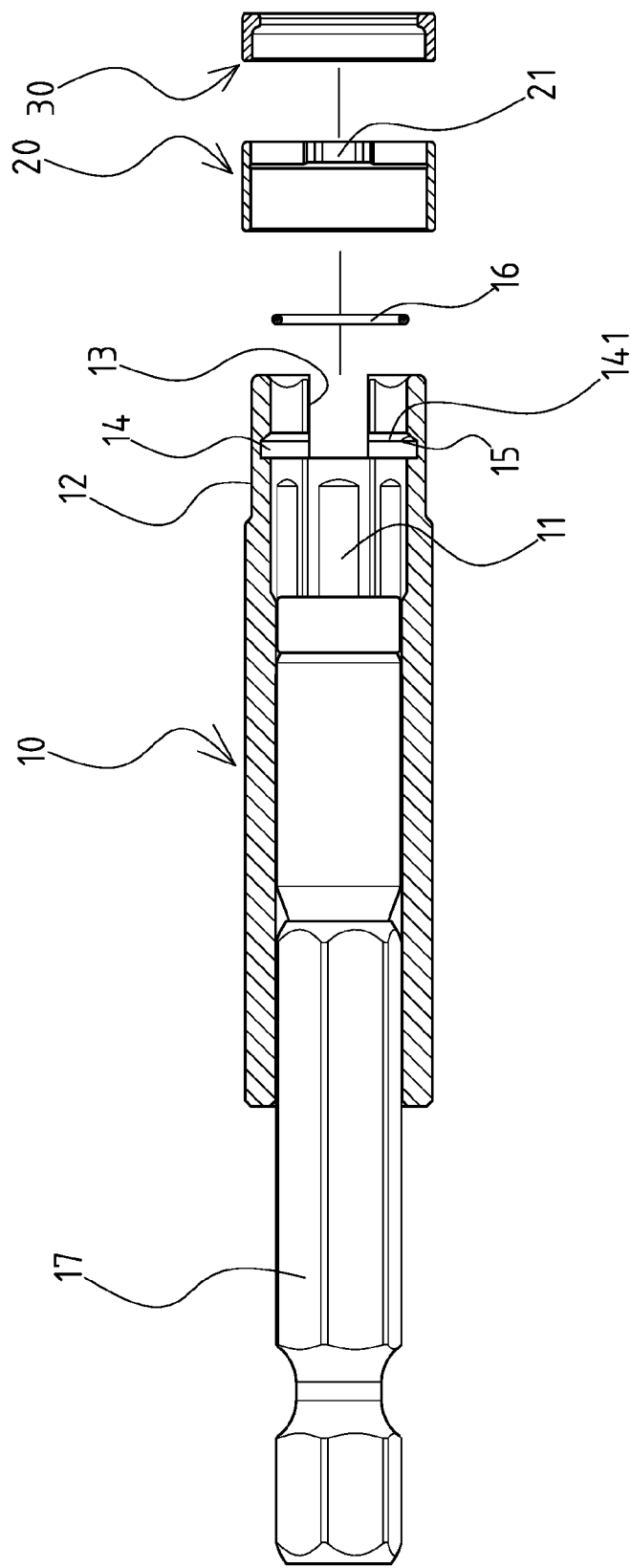
FIG. 2 is an exploded perspective view of a quick-release device for screwdriver bits in accordance with the present invention.
Figure 3:
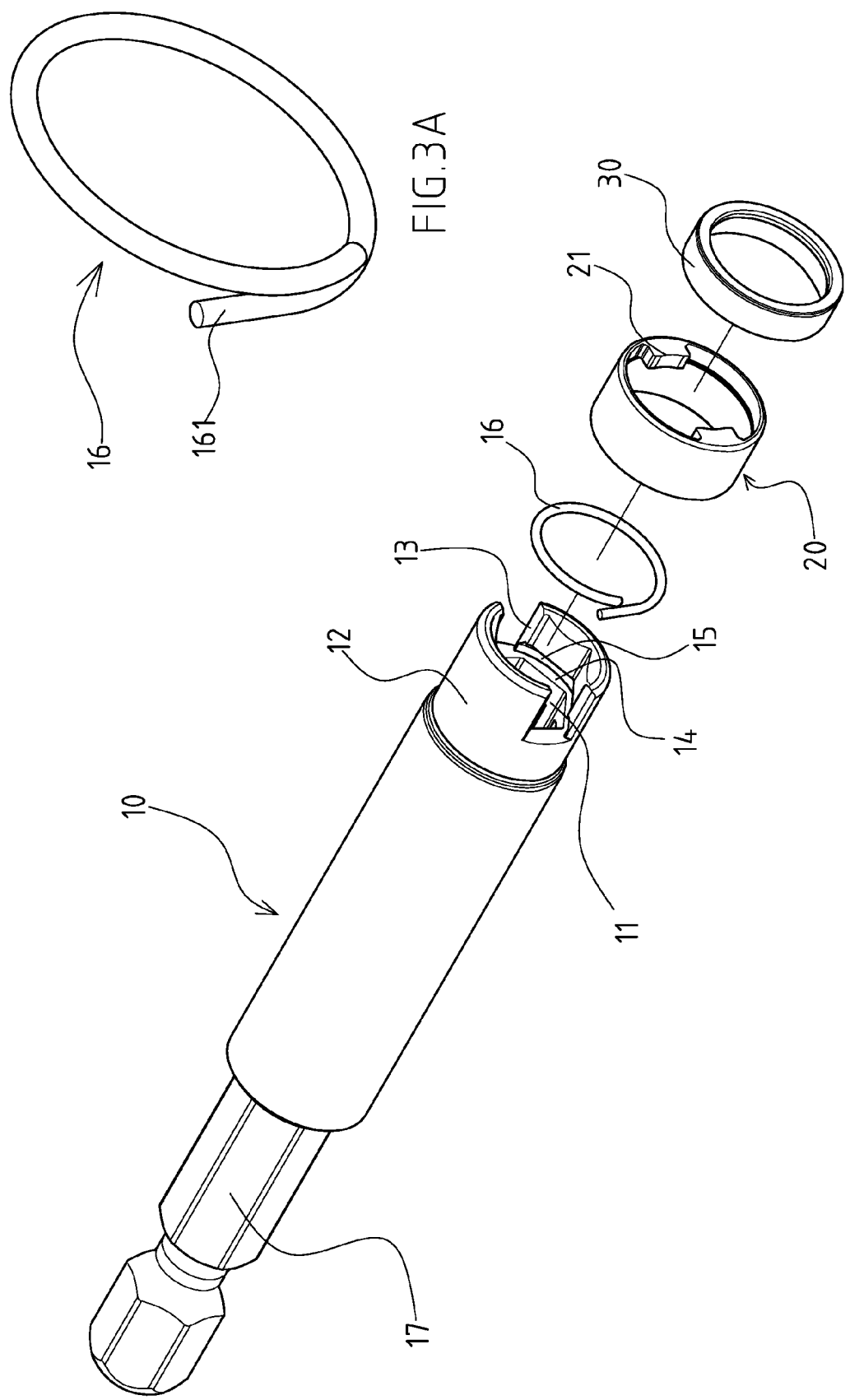
FIG. 3 is a cross-sectional view of the quick-release device for screwdriver bits in FIG. 2.
Figure 4:
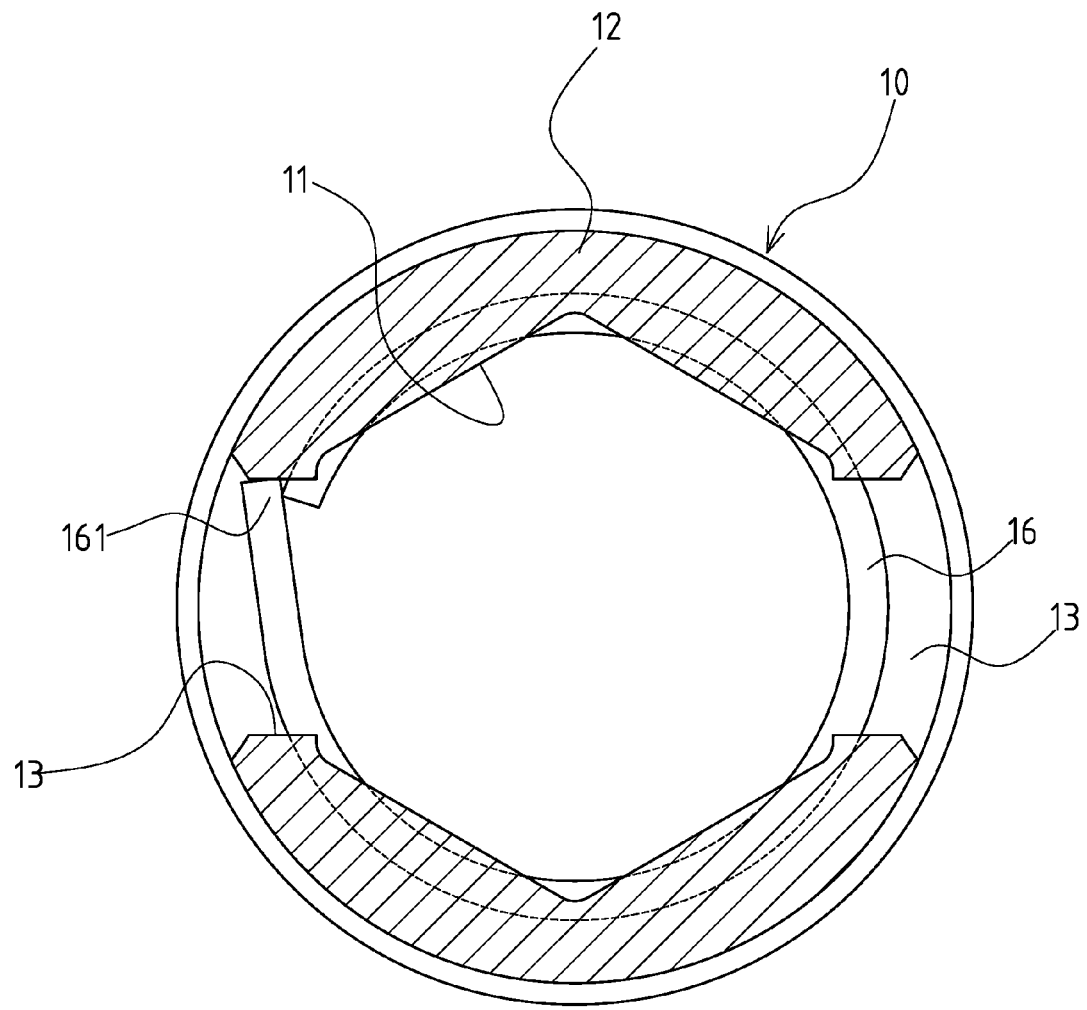
FIG. 4 is a front plan view of the quick-release device for screwdriver bits in accordance with the present invention.

Referring to the drawings and initially to FIGS. 1-4, a quick-release device for screwdriver bits in accordance with the present invention comprises a shank 10, a sleeve 20 movably sleeved on one end of the shank 10 and a stopper 30 is secured on one end of the shank 10 for preventing the sleeve 20 from removing from the shank 10.

The shank 10 has a first end and a second end. The shank 10 has a polygonal hole 11 longitudinally defined in the first end of the shank 10 for partially receiving a bit 40, wherein the bit 40 has a hexagon cross-section and three diagonals each having two opposite ends respectively having indentation defined therein. A hollow stub 12 longitudinally extends from the first end of the shank 10 and at least one slot 13 is longitudinally defined in the hollow stub 12. In the preferred embodiment of the present invention, the hollow stub 12 has a diameter smaller than that of the shank 10 and a diametrical difference is formed between the shank 10 and the hollow stub 12, wherein the diametrical difference is equal to a thickness of the sleeve 20. The hollow stub 12 has two slots 13 defined therein and the two slots 13 diametrically correspond to each other. In the preferred embodiment of the present invention, the width of the slot 13 is smaller than that of a side of the polygonal hole 11. An annular groove 14 is defined in an inner periphery of the polygonal hole 11 and communicates with the at least one slot 13. The annular groove 14 is formed with a tapered section 15 toward the hollow stub 12 such that a divide line 141 is formed between the tapered section 15 and the annular groove 14 and the at least one slot 13 extends to a bottom of the annular groove 14. An expandable locking member 16 is received in the annular groove 14, wherein the locking member 16 has an outer diameter slightly smaller than an inside diameter of the annular groove 14. In the preferred embodiment of the present invention, the locking member 16 is a spring and formed with an overlapping portion corresponding to the at least one slot 13. A buckle 161 linearly extends from one to two opposite end of the overlapping portion along a tangent of the locking member 16. The buckle 161 is stick-like and has a free end and a shank, wherein the free end is engaged to a side of the at least one slot 13 and the shank of the buckle 161 is engaged to an edge of the at least one slot 13 such that the locking member 16 is non-rotatable relative to the shank 10. The shank 10 further includes a polygonal shaft 17 extending from the second end thereof. The polygonal shaft 17 is adapted to be connected to a handle (not shown) for operator to easily operate the bit 40.

Figure 5:
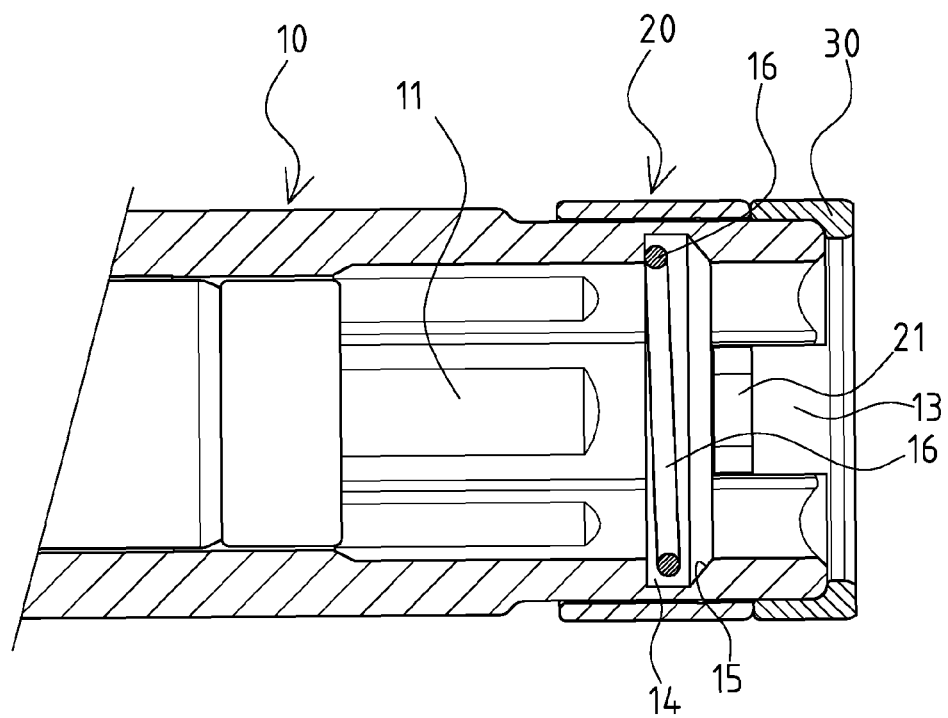
FIGS. 5 to 11 are operational views of the quick-release device for screwdriver bits in accordance with the present invention.
Figure 7:
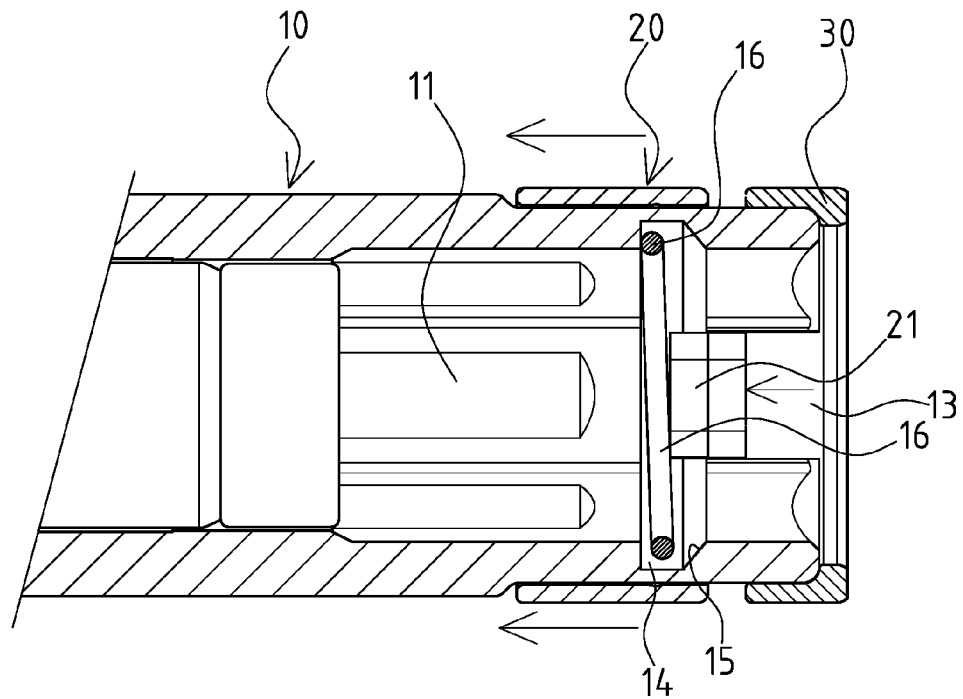
Figure 8:
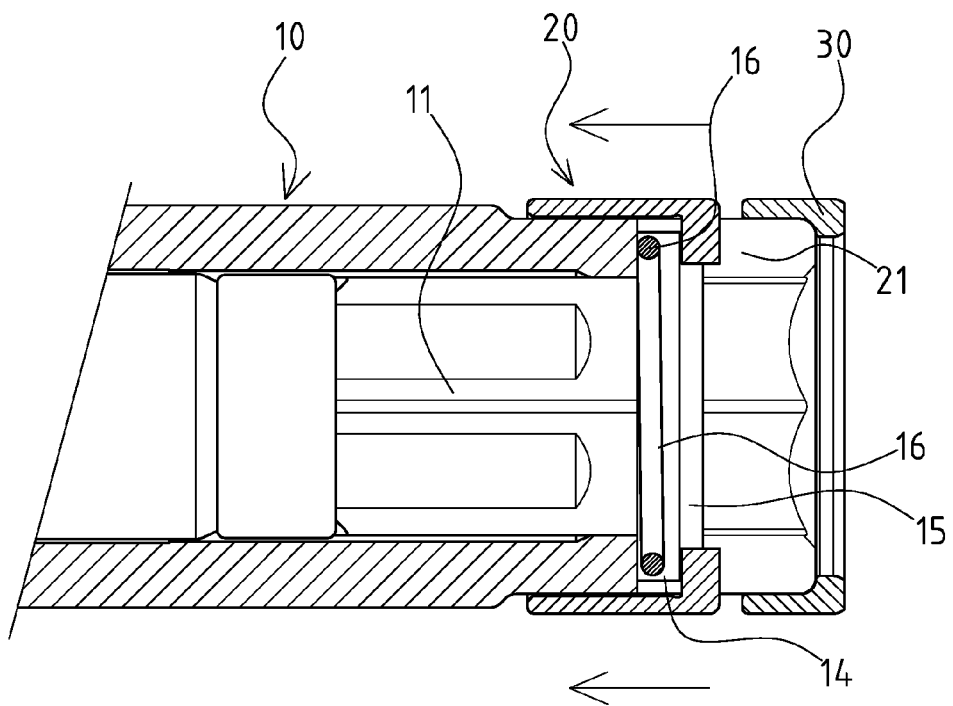

The sleeve 20 is movably sleeved on the hollow stub 12 and reciprocally moved relative to the hollow stub 12. The sleeve 20 has at least one protrusion 21 inwardly extending therefrom, wherein the at least one protrusion 21 is engaged into the at least one slot 13 to prevent the sleeve 20 from being rotated relative to the hollow stub 12. That at least one protrusion 21 has a thickness greater than a height of the tapered section 15 and the at least one protrusion 21 has a bottom 211 corresponding to the overlapping portion of the locking member 16. The bottom 211 of the protrusion 21 selectively abuts against the overlapping portion of the locking member 16 when removing the bit 40 form the polygonal hole 11. The sleeve 20 has two positions, including a locking position and a releasing position, relative to the bit 40. With reference to FIG. 5, the sleeve 20 is situated in the locking position relative to the bit 40 when the protrusion 21 is separated from the annular groove 14 and the bit 40 is positioned. With reference to FIG. 7, the sleeve 20 is situated in the releasing position relative to the bit 40 and the bit 40 can be free detached from the polygonal hole 11 when the bottom 211 of the protrusion 21 moved over the divided line 141 and into the annular groove 14 to abut the locking member 16.

Figure 6:
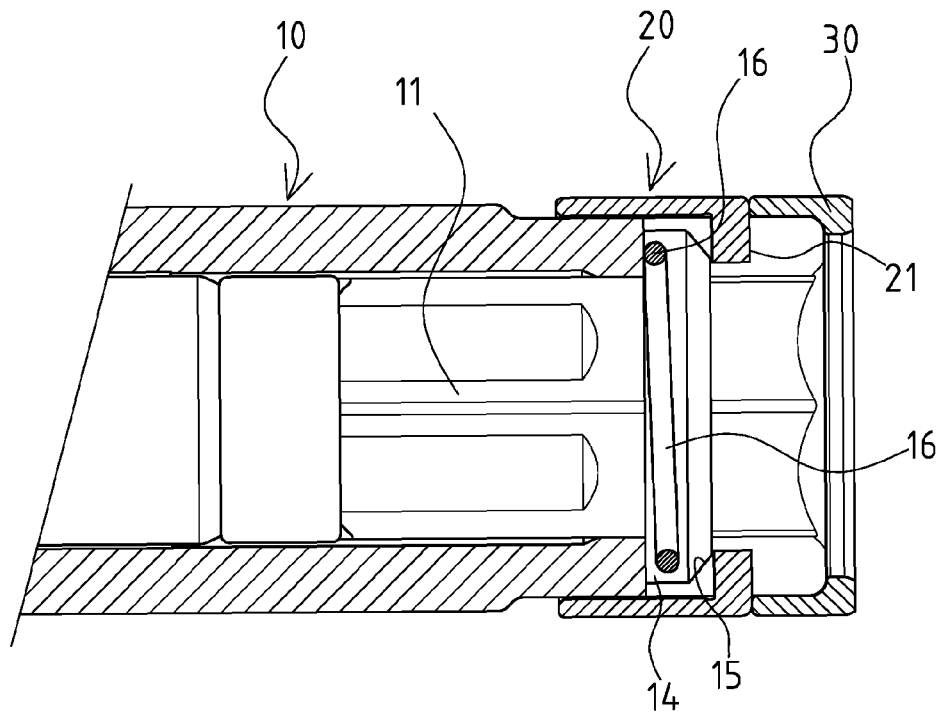
Figure 9:
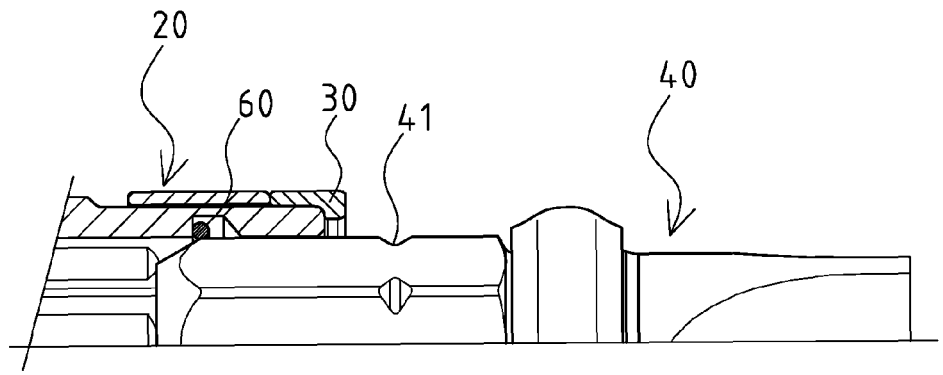
Figure 10:
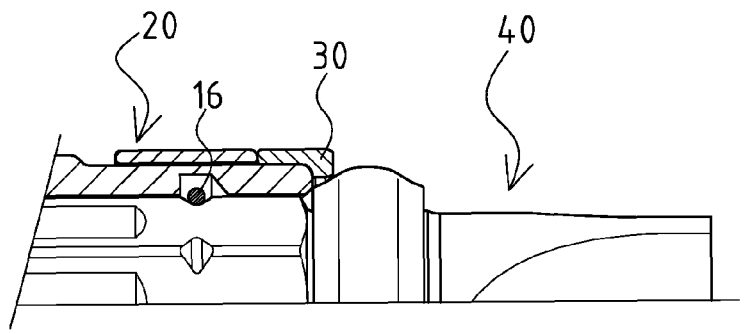
Figure 11:
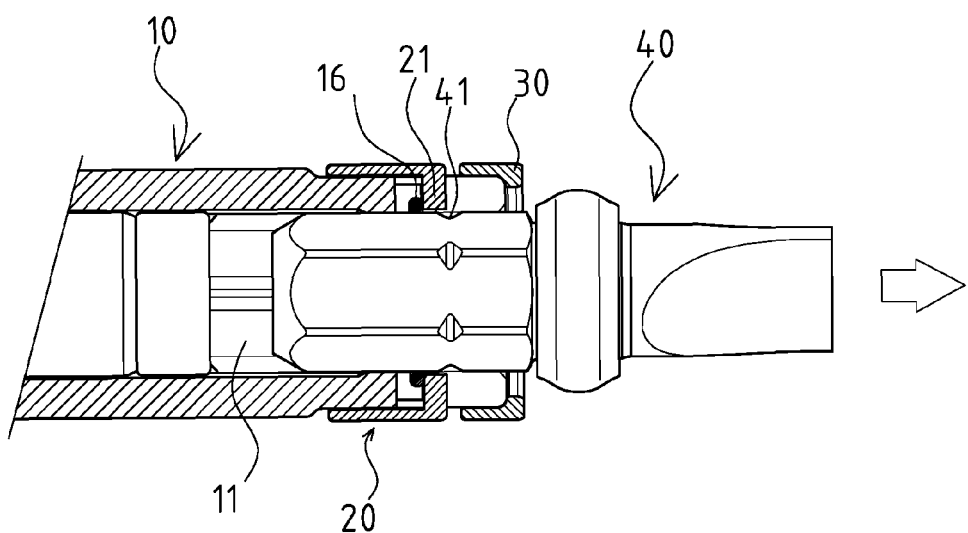

With reference to FIGS. 1, 5 and 6, the bottom of the bit 40 is directly inserted into the polygonal hole 11 when assembling the bit 40 the quick-release device in accordance with the present invention. Further with reference to FIG. 9, the locking member 16 is expended due to the shank is the bit 40 after the bottom of the bit 40 passing through the locking member 16 and than the bit 40 is continually axially moved into the polygonal hole 11. With reference to FIG. 10, the locking member 16 directly engaged into the indentations 41 peripherally defined in the bit 40 and the bottom of the bit 40 abuts a bottom of the polygonal hole 11 when the locking member 16 horizontally corresponds to the groove 41. Consequently, the operator can easily drive a screw by using the quick-release device in accordance with the present invention when the bit 41 is inserted into and positioned in the polygonal hole 11. Under this condition, the locking member 16 is moved with the bit 40 when the bit 40 is reversely pulled. The locking member 16 is inwardly pushed to more tightly engage into the groove 41 due to the tapered section 15 of the annular groove 14 in the shank 10 such that the bit 40 cannot be freely removing from the polygonal hole 11 in the shank 10.

With reference to FIGS. 1, 7, 8 and 11, when removing the bit 40 from the polygonal hole 11 in the shank 10, the sleeve 20 is inwardly moved relative to the shank 10 to make the at least one protrusion 21 engaged to the locking member 16. Consequently, the locking member 16 does not be moved with the bit 40 toward the tapered section 15 when the bit 40 is pulled from the polygonal hole 11 in the shank 10 such that the bit 40 in the polygonal hole 11 is removed from the shank 10 when the locking member 16 is expanded due to the moving bit 40.

As described above, the quick-release device for screwdriver bits in accordance with the present invention includes the following advantages.

1. Cost down: the steel balls of the conventional quick-release device for screwdriver bits is unnecessary to the quick-release device in accordance with the present invention because the quick-release device in accordance with the present invention uses a one-piece locking member for locating the mounted bit, wherein the locking member is cheap because it is a marketed specified product such that the manufacturing cast of the quick-release device in accordance with the present invention is reduced.
2. The free end of the buckle of the locking member is engaged to a side of the at least one slot and the shank of the buckle is engaged to an edge of the at least one slot such that the locking member is non-rotatable relative to the shank for ensuring the relative positions of the overlapping portion of the locking member and the protrusion.
3. The shank of the present invention does not need to process cavities for mounting steel balls that the thickness of the shank is made thinner relative to the conventional quick-release device for screwdriver bits. In addition, the diametrical difference, between the shank and the sleeve, is equal to a thickness of the sleeve such that the total weight of the shank does not be raised.

Although the invention has been explained in relation to its preferred embodiment, it is to be understood that many other possible modifications and variations can be made without departing from the spirit and scope of the invention as hereinafter claimed.

I claim:

1. A quick-release device for screwdriver bit, the quick release device comprising:
    a shank having a first end and a second end, said shank having a polygonal hole longitudinally defined in the first end thereof and adapted for partially receiving the bit, wherein the bit has a groove annularly defined therein, at least one slot is longitudinally defined in the first end of said shank, an annular groove is defined in an inner periphery of the polygonal hole and communicates with the at least one slot;
    a tapered section annularly formed on an inner periphery of the annular groove toward the first end of said shank, a divide line being formed between the annular groove and said tapered section;
    an expandable locking member received in the annular groove, wherein said expandable locking member has an outer diameter slightly smaller than a diameter of the annular groove and said expandable locking member is adapted to be selectively engaged into indentations peripherally defined in the bit, wherein said expandable locking member is a spring having an overlapping portion corresponding to the at least one slot, said expandable locking member having a buckle linearly extending from one of the two opposite ends of the overlapping portion along a tangent thereof, the buckle being of a stick shape and having a free end and a shank, wherein the free end is engaged to a side of the at least one slot and wherein the shank of the buckle is engaged to an edge of the at least one slot such that the locking member is non-rotatable relative to the shank; a sleeve movably sleeved on the first end of the shank, said sleeve having at least one protrusion inwardly extending therefrom, wherein the at least one protrusion is engaged into the at least one slot to prevent the sleeve from being rotated relative to a hollow stub of said shank, the at least one protrusion selectively abutting against said expandable locking member when removing the bit from the polygonal hole, wherein said sleeve has a locking position and a releasing position relative to the bit, said sleeve situated in the locking position relative to the bit when the protrusion is separated from the annular groove and the bit is positioned, said sleeve situated in the releasing position relative to the bit and the bit being freely detached from the polygonal hole when the bottom of the protrusion is moved over the divide line and into the annular groove to abut the expandable locking member; and a stopper secured on one end of said shank for preventing said sleeve from releasing from said shank.

2. The quick-release device of claimed in claim 1, wherein the at least one slot has a width smaller than a width of a side of the polygonal hole.

3. The quick-release device of claim 1, wherein the hollow stub longitudinally extends from the first end thereof and the at least one slot is longitudinally defined in the hollow stub, said sleeve being movably sleeved on the hollow stub, the hollow stub having a diameter smaller than a diameter of the shank so that a diametrical difference is formed between said shank and the hollow stub, wherein the diametrical difference is equal to a thickness of the sleeve.

4. The quick-release device of claim 1, wherein the at least one slot extends to a bottom of the annular groove.

5. The quick-release device of claim 3, wherein the at least one slot extends to a bottom of the annular groove.

* * * * *